United States Patent [19]

Chisholm

[11] Patent Number: 4,862,996
[45] Date of Patent: Sep. 5, 1989

[54] APPARATUS FOR APPLYING A LIQUID TO A WIRE ROPE

[76] Inventor: Ron Chisholm, 9 Red Oak Court S.E., Medicine Hat, Alberta, Canada, T1B 2X7

[21] Appl. No.: 202,452

[22] Filed: Jun. 6, 1988

[51] Int. Cl.⁴ ............................................. F16N 7/26
[52] U.S. Cl. ................................................. 184/15.1
[58] Field of Search ................... 184/15.1, 15.2–17; 15/210 B; 118/405, 326, 316, DIG. 18

[56] References Cited

U.S. PATENT DOCUMENTS

| | | | |
|---|---|---|---|
| 3,710,758 | 1/1973 | Hoff | 118/316 |
| 3,889,781 | 6/1975 | Schott et al. | 184/15.1 |
| 4,063,617 | 12/1977 | Shenk | 184/15.1 |
| 4,169,427 | 10/1979 | Crump et al. | 184/15.1 |
| 4,296,837 | 10/1981 | Charlton | 184/15.1 |
| 4,498,558 | 2/1985 | Bendahan | 184/15.1 |
| 4,630,712 | 12/1986 | Hoseley | 184/15.3 |

Primary Examiner—Carlton R. Croyle
Assistant Examiner—Robert N. Blackman
Attorney, Agent, or Firm—Harold H. Dutton, Jr.; George H. Dunsmuir

[57] ABSTRACT

Liquid is applied to a wire rope by passing the rope through an elongated casing in which liquid is sprayed against the rope, excess liquid being discharged through annular grooves containing discharge openings upstream and downstream of the liquid inlet. Air is blown against the rope upstream and downstream of the annular grooves and discharge openings for causing the liquid to be discharged through such openings and not through the ends of the casing.

5 Claims, 6 Drawing Sheets

APPARATUS FOR APPLYING A LIQUID TO A WIRE ROPE

BACKGROUND OF THE INVENTION

This invention relates to an apparatus for applying a liquid to a wire rope.

More specifically, the invention relates to an apparatus for thoroughly saturating wire rope with a wide variety of liquids including oils, preservatives, solvents, cleaners or other chemicals. Apparatuses of generally the type described herein are disclosed, for example by U.S. Pat. Nos. 3,889,781, which issued to R. A. Schott et al on June 17, 1975; 4,063,617, which issued to W. J. Shenk on Dec. 20, 1977 and 4,498,558, which issued to S. H. Bendahan on Feb. 12, 1985. The Bendanhan patent discloses a device which is somewhat similar to the apparatus described herein.

One of the problems of available lubricators is that excess lubricant is discharged from the device with the cable, i.e. the lubricators are messy and cause waste. The Bendahan patent attempts to solve this problem by providing a pair of annular chambers for receiving excess grease upstream and downstream of a central greasing chamber in the direction of cable travel. Bendahan also provides a threaded passage and scraper plates in an attempt to seal the lubricating device. While the Bendahan patent goes a long way toward solving the problem of liquid leakage, there is still room for improvement in the field of devices for applying a liquid to a wire rope or cable.

The object of the present invention is to solve the above-identified problems by providing a relatively simple apparatus for applying a liquid to a wire rope which is relatively mess-free, of rugged construction, easy to use and cost efficient.

BRIEF SUMMARY OF THE INVENTION

Accordingly, the present invention relates to an apparatus for applying a liquid to a wire rope comprising casing means; rope passage means extending through said casing means permitting the unimpeded movement of a wire rope therethrough; at least one inlet duct means in said casing means for receiving liquid from a source of liquid under pressure, and for spraying the liquid against the wire rope; outlet passage means in said casing means upstream and downstream of said inlet duct means in the direction of wire rope travel for discharging excess liquid from said casing means; and inlet orifice means upstream and downstream of said outlet passage means for discharging air under pressure against the rope for directing excess liquid towards said outlet passage means, thereby at least impeding the escape of the liquid through the ends of said passage means.

BRIEF DESCRIPTION OF THE DRAWINGS

The invention will be described in greater detail with reference to the accompanying drawings, which illustrate a preferred embodiment of the invention, and wherein.

Figure 1:
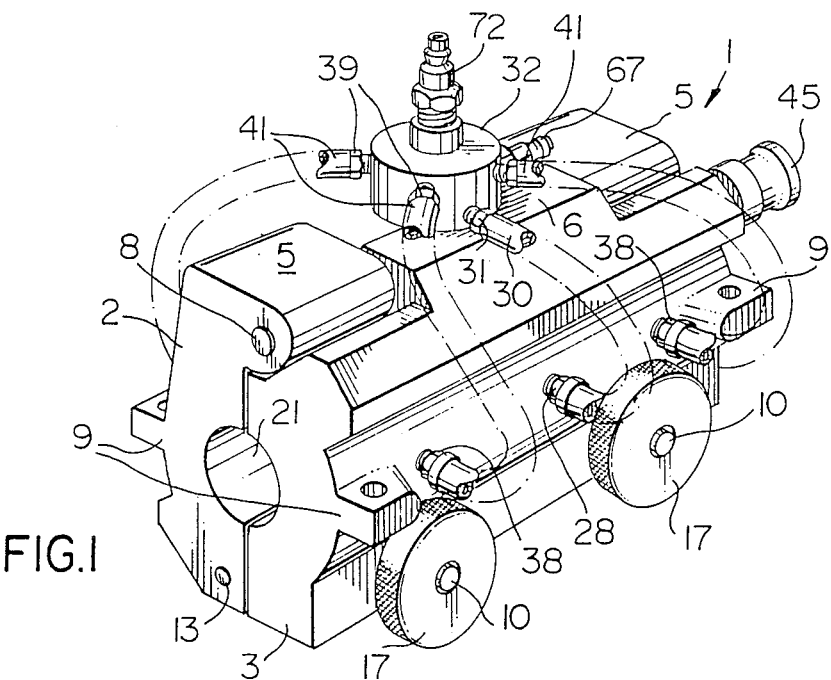
FIG. 1 is a perspective view from one side and above of an apparatus in accordance with the present invention.
Figure 2:
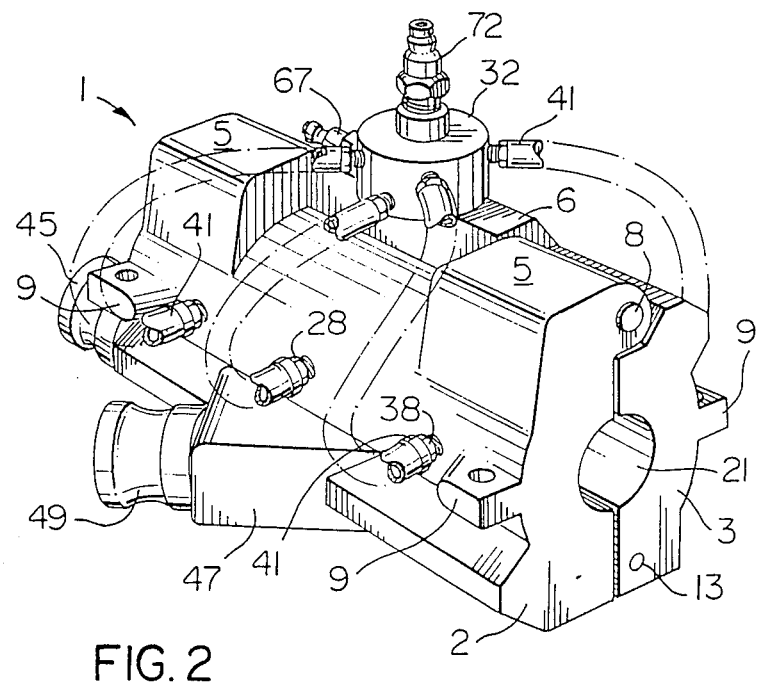
FIG. 2 is a perspective view from the other side and above of the apparatus of FIG. 1.
Figure 3:
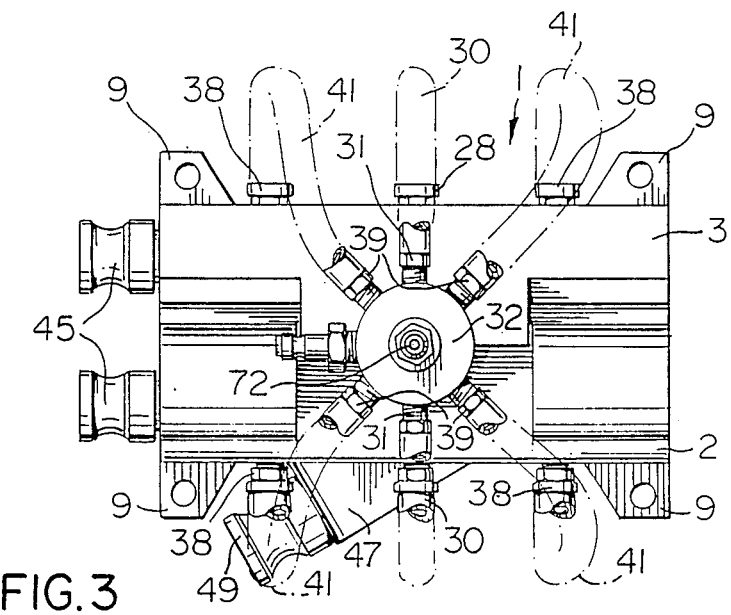
FIG. 3 is a plan view of the apparatus of FIG. 1.
Figure 4:
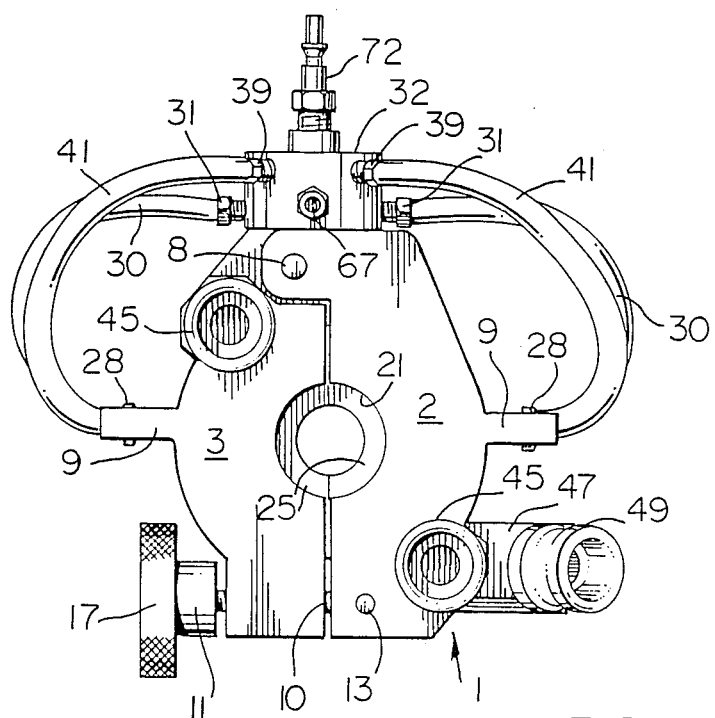
FIG. 4 is an end view of the apparatus of FIGS. 1 to 3.
Figure 5:
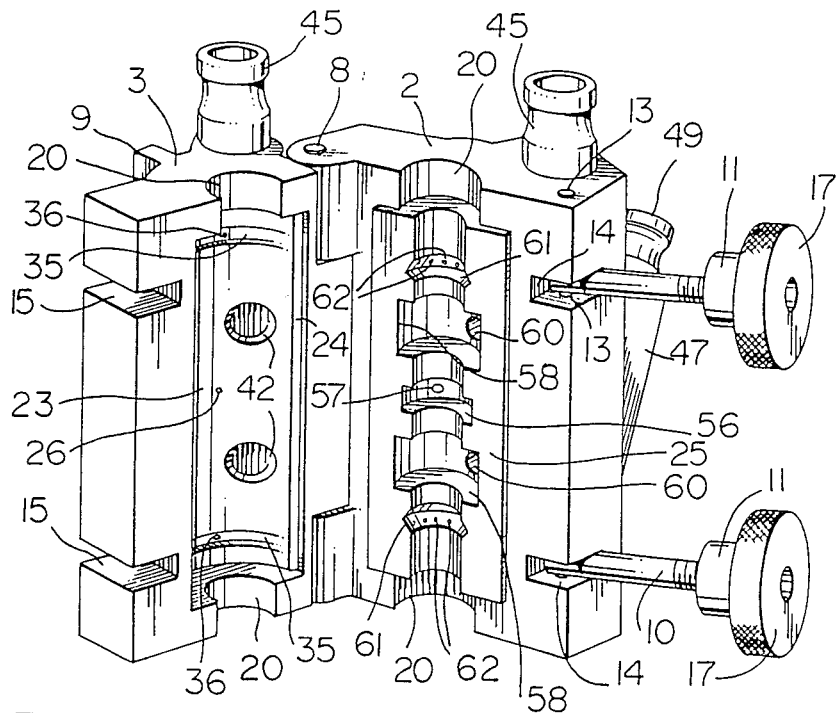
FIG. 5 in a perspective view of the apparatus of FIGS. 1 to 4 in the open condition, with a part removed.

With reference to the drawings, the apparatus of the present invention includes an oblong, more or less cylindrical casing generally indicated at 1 defined by a pair of hingedly interconnected sections 2 and 3. A pair of arms 5 are provided on the ends of one section 2 for overlapping portions of the section 3 and a central projection 6 on the section 3. A pin 8 extends through the arms 5 and the projection 6 to pivotally interconnect the sections 2 and 3. Lugs 9 extend outwardly from the middle of each end of both sides of the sections 2 and 3 for mounting or suspending the body 1 in a position suitable for receiving a wire rope (not shown).

The sections 2 and 3 are maintained in the closed position by a pair of rods 10, which resemble headless machine bolts, and cylindrical nuts 11. The unthreaded inner end of each rod 10 is pivotally mounted on a pin 13 extending the length of casing section 1 on the side opposite the hinge. The rods 10 rotate around the longitudinal axis of the pin 13 into and out of aligned grooves 14 and 15 in the casing sections 2 and 3, respectively. The head 17 of the nut 11 is enlarged and has a knurled periphery for facilitating manual rotation of the nuts 11 on the threaded outer ends of the rods 10. In the closed position of the casing 1, the nuts 11 are tightened against the side of a square corner 18 of the section 3 to secure the casing 1 in the closed position.

A semicylindrical groove 20 (FIG. 5) is provided in each casing section 2 and 3 for defining a longitudinally extending central passage in the casing 1 when in the closed position. The casing 1 is closed around a wire rope (not shown) for treating the latter with liquid. A major portion of the length of each groove 20 is enlarged to define a deep semicylindrical recess 23 with a shoulder 24 at each side thereof for receiving an insert 5 (FIGS. 5 and 8 to 10). The recesses 23 are identical and accordingly only one is described in detail. A central liquid inlet orifice 26 is provided in the centre of each recess. One threaded end of a tube coupler 28 is mounted in the threaded, countersunk outer end 29 of the orifice 26. A tube 30 extends from the coupler 28 to a coupler 31 in one side of a manifold 32 (described hereinafter in greater detail). A semi-annular, transversely extending groove 35 is provided near each end of the recesses 23, with an air inlet opening 36 in the bottom centre thereof. The ends of the grooves 35 taper, i.e. become progressively more shallow towards their ends, so that the groove ends terminate slightly beneath the square, recessed shoulders 24 extending the length of each side of the recess 23. The air inlet openings 36 are connected by couplers 38 and 30, and tubes 41 to the manifold 32.

Figure 6:
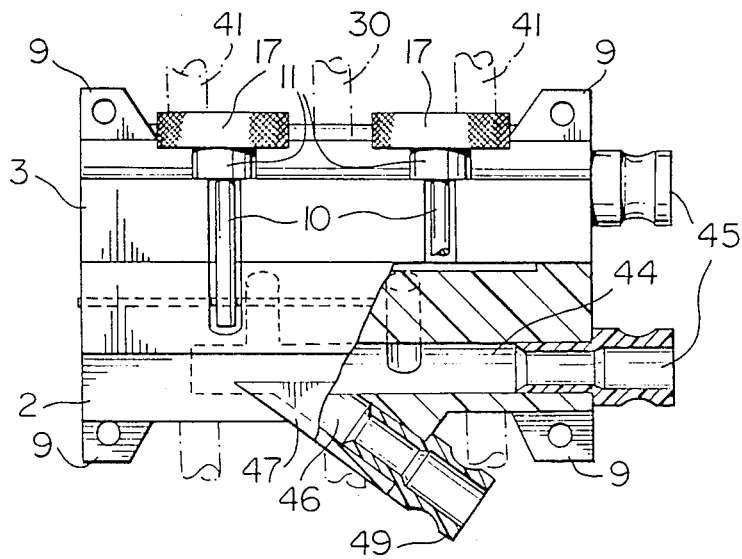
FIG. 6 is a partly sectioned bottom view of the apparatus of FIGS. 1 to 5.
Figure 7:
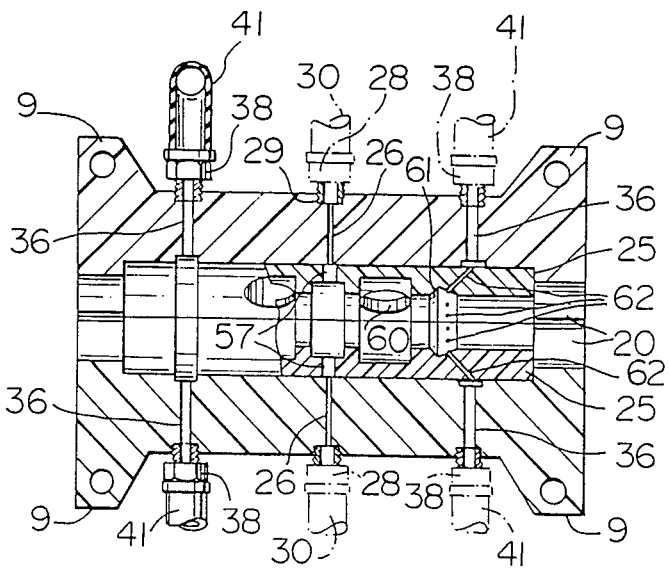
FIG. 7 is a longitudinal, sectional view of the apparatus of FIGS. 1 to 6.

A pair of large liquid discharge openings 42 are provided on one side of the recess 23. The openings 42 communicate with a longitudinally extending discharge passage 44 (FIG. 6). A coupler 45 for connecting the casing 1 to discharge tubing (not shown) extends into the outer end of the discharge passage 44. An extra, diagonal liquid outlet or discharge passage 46 is provided in a projection 47 on one side of the casing section 2. A coupler 49 is mounted in the outer end of the passage 46 for connecting the latter to discharge tubing. In the closed position of the casing 1 (FIGS. 1 to 4), the openings 42 are diametrically opposed to each other.

Figure 8:
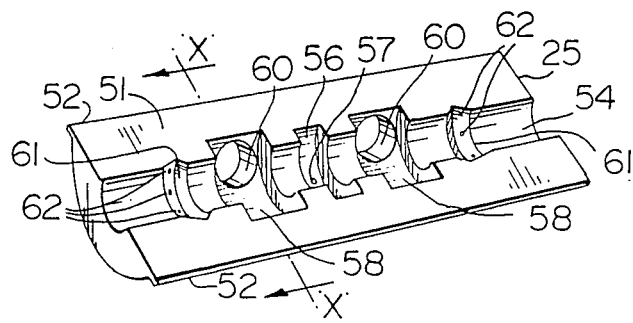
FIG. 8 is a perspective view from one end and the inner surface of a manifold block used in the apparatus of FIGS. 1 to 7.
Figure 9:
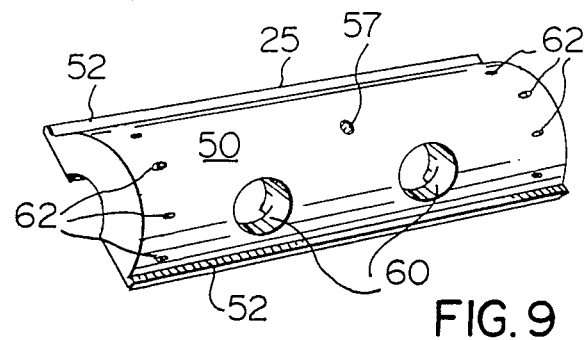
FIG. 9 is a perspective view of the outer surface and one end of the manifold block of FIG. 8.
Figure 10:
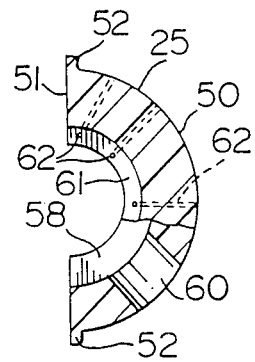
FIG. 10 is a cross section taken generally along line X—X of FIG. 8.

As best shown in FIGS. 8 to 10, each insert 25 includes a semicylindrical outer surface 50 for abutting the recess 23, and a planar inner surface 51. Flanges 52 extend outwardly from the sides of the inner surface 51 for resting on the shoulder 24. A semicylindrical recess 54 extends the entire length of the inner surface 51, so that when the casing 1 is closed, the inserts 25 form an inner casing through which the wire rope can pass freely. A semi-annular groove 56 extends transversely of the centre of the recess 54 for forming an annular liquid passage. A central liquid inlet orifice 57 in the centre of the groove 56 is aligned with the inlet orifice 26 in the casing section 2 or 3 for admitting liquid under pressure into the groove 56. Larger, rectangular discharge grooves 58 are provided on each side of the groove 56, with openings 60 for aligning with the openings 42 in the casing sections 2 and 3. Semi-annular, generally V-shaped end grooves, 61 contain the discharge ends of a plurality of inclined, inwardly tapering air inlet orifices 62. The orifices 62 communicate with the grooves 35 for introducing air into the central passage at an angle from each end.

Figure 11:
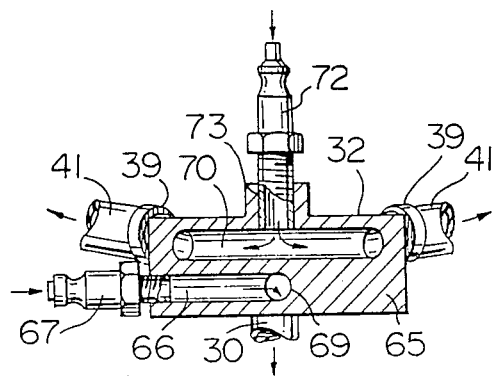
FIG. 11 is a cross-sectional view of a manifold used in the apparatus of FIGS. 1 to 7.
Figure 12:
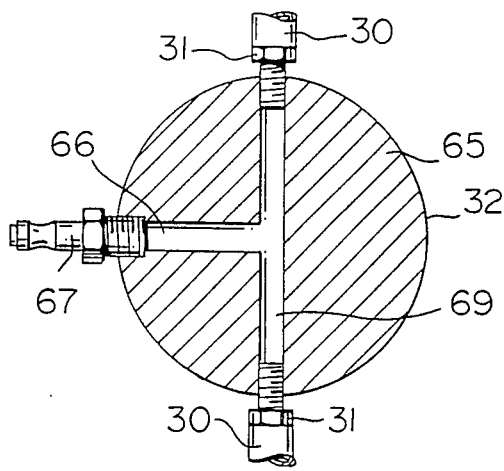
FIGS. 12 and 13 are longitudinal, sectional views of the manifold of FIG. 11.
Figure 13:
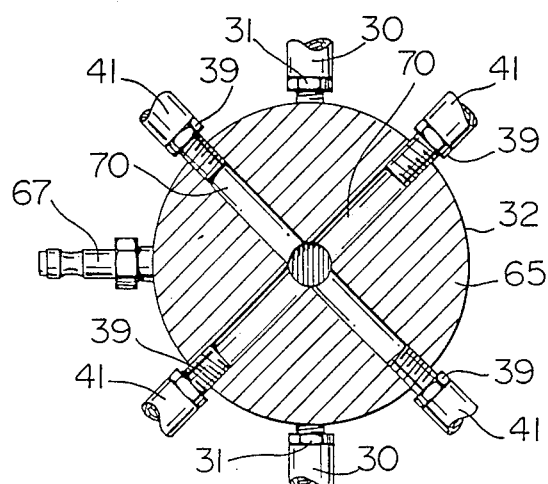

As shown in FIGS. 11 to 13, the manifold 32 is defined by a disc-shaped metal body 65, which is separate from the casing 1. Oil or another liquid is introduced into an inlet passage 66 in the body 65 via a tube coupler 67. The passage 66 is connected to a second passage 69 which is perpendicular to the passage 66 for discharging the liquid into the tubes 30. A second set of diametrically extending passages 70 intersect each other above the passages 66 and 69 for introducing air into the tubes 41. The air enters the body 65 through a coupler 72 and a central vertical passage 73 and is discharged through the passages 70 and the tubes 41 into the casing 1.

Prior to using the apparatus, the insert size, i.e. the dimensions of the passage defined by the recess 54 is adjusted to the wire rope diameter. This operation is quite simple, merely involving the replacing of one pair of inserts 25 with another set of block. The casing 1 is closed around a wire rope and locked in the closed position using the rods 10 and the nuts 11. The casing 1 can be oriented in the vertical or horizontal position.

The wire rope is set in motion and passes continuously through the manifold block 25. Oil or another liquid is injected under pressure through the manifold 32 and the tubes 30 into body sides of the casing 1. The oil passes through the orifices 26 and 57, and the groove 56 entering the strands of the wire rope. At the same time air under pressure injected into the manifold 32 is discharged through tubes 41 into body sides and both ends of the casing 1. The air passes through openings 36, the grooves 35, and the orifices 62. The air is injected at an acute angle to the longitudinal axis of the wire rope. The orifices 62 are inclined towards each other, i.e. towards the grooves 58, so that any loose oil is blown into the grooves 58. The oil is discharged from the casing 1 via the openings 60 and 42, and the passages 44 and 46. The oil can be recycled for use in lubricating other sections of the wire rope.

What is claimed is:

1. An apparatus for applying a liquid to a wire rope comprising a casing and a rope passage extending through said casing means permitting the unimpeded movement of a wire rope therethrough; at least one inlet duct means and a liquid inlet chamber in said casing means for receiving liquid from a source of liquid under pressure and for spraying the liquid against the wire rope; outlet passage means including outlet chambers in said casing means upstream and downstream of said inlet chamber in the direction of wire rope travel for receiving and discharging excess liquid from said inlet chamber; a generally V-shaped annular groove formed in said rope passage upstream and downstream of said outlet chambers, air inlet means opening into one side of each of said V-shaped grooves for directing air toward said outlet chambers, a partition wall in said casing between said V-shaped grooves and said outlet chambers, said air inlet means discharging air under pressure into said V-shaped grooves and towards said outlet chambers, thereby impeding the escape of the liquid through the ends of said passage means.

2. An apparatus according to claim 1, wherein said air inlet means are inclined toward said outlet passage means for directing liquid towards the latter.

3. An apparatus according to claim 1, including manifold means for receiving air and liquid and diverting the air and liquid to the casing means.

4. An apparatus according to claim 3, wherein said manifold means includes body means; air inlet means for introducing air into said body means; air outlet means for discharging air to said casing means; liquid inlet means for receiving liquid from a source of liquid under pressure; and liquid outlet means for discharging liquid to said casing means.

5. An apparatus according to claim 4, including a plurality of air inlet openings in said casing means for receiving air from said manifold means; and a plurality of liquid inlet orifices in said casing means for receiving liquid from said manifold means.

* * * * *